(12) United States Patent
Nordbruch (10) Patent No.: US 10,496,092 B2
(45) Date of Patent: Dec. 3, 2019

(54) METHOD AND DEVICE FOR MONITORING AN AUTONOMOUS DRIVING OPERATION OF A MOTOR VEHICLE WITHIN A PARKING FACILITY

(71) Applicant: Robert Bosch GmbH, Stuttgart (DE)

(72) Inventor: Stefan Nordbruch, Kornwestheim (DE)

(73) Assignee: ROBERT BOSCH GMBH, Stuttgart (DE)

( * ) Notice: Subject to any disclaimer, the term of this patent is extended or adjusted under 35 U.S.C. 154(b) by 173 days.

(21) Appl. No.: 15/408,242

(22) Filed: Jan. 17, 2017

(65) Prior Publication Data

US 2017/0205824 A1    Jul. 20, 2017

(30) Foreign Application Priority Data

Jan. 20, 2016  (DE) .................. 10 2016 200 734

(51) Int. Cl.

| | |
|---|---|
| *G05D 1/00* | (2006.01) |
| *B60W 10/18* | (2012.01) |
| *B60W 10/20* | (2006.01) |
| *B62D 15/02* | (2006.01) |
| *G05D 1/02* | (2006.01) |
| *G08G 1/16* | (2006.01) |
| *G08G 1/14* | (2006.01) |

(Continued)

(52) U.S. Cl.
CPC .......... *G05D 1/0088* (2013.01); *B60W 10/18* (2013.01); *B60W 10/20* (2013.01); *B62D 15/0285* (2013.01); *G05D 1/021* (2013.01); *G08G 1/146* (2013.01); *G08G 1/147* (2013.01); *G08G 1/168* (2013.01); *B60W 30/08* (2013.01); *B60W 2050/0077* (2013.01); *B60W 2050/0083* (2013.01); *B60W 2710/18* (2013.01); *B60W 2710/20* (2013.01)

(58) Field of Classification Search
None
See application file for complete search history.

(56) References Cited

U.S. PATENT DOCUMENTS

| | | | |
|---|---|---|---|
| 2015/0142244 A1* | 5/2015 | You ...................... | G01C 21/00 701/23 |
| 2015/0149265 A1* | 5/2015 | Huntzicker ........... | B60W 30/06 705/13 |
| 2016/0125736 A1* | 5/2016 | Shaik .................... | G08G 1/14 701/23 |

FOREIGN PATENT DOCUMENTS

| | | |
|---|---|---|
| DE | 102009050399 A1 | 5/2011 |
| DE | 102011013681 A1 | 9/2012 |
| DE | 102011084124 A1 | 4/2013 |

(Continued)

*Primary Examiner* — Mussa A Shaawat
*Assistant Examiner* — Abdhesh K Jha
(74) *Attorney, Agent, or Firm* — Norton Rose Fulbright US LLP; Gerard Messina (57) ABSTRACT

A method for monitoring an autonomous driving operation of a motor vehicle within a parking facility including the following: ascertaining data for an autonomous driving operation of the motor vehicle; checking the ascertained data for errors before the data are used for the autonomous driving operation of the motor vehicle; if the check revealed that the data have no errors, then using the data to autonomously drive the motor vehicle; and if the check revealed that the data have an error, then carrying out a safety action to reduce a risk of collision for the autonomously driving motor vehicle. Also described is a corresponding device, a motor vehicle, a parking facility, and a computer program.

19 Claims, 8 Drawing Sheets

(51) Int. Cl.
*B60W 30/08* (2012.01)
*B60W 50/00* (2006.01)

(56) References Cited

FOREIGN PATENT DOCUMENTS

| | | | | |
|---|---|---|---|---|
| DE | 102012222562 A1 | 6/2014 | | |
| EP | 2390862 A2 * | 11/2011 | ........ | B60W 50/0205 |

* cited by examiner

METHOD AND DEVICE FOR MONITORING AN AUTONOMOUS DRIVING OPERATION OF A MOTOR VEHICLE WITHIN A PARKING FACILITY

RELATED APPLICATION INFORMATION

The present application claims priority to and the benefit of German patent application no. 10 2016 200 734.3, which was filed in Germany on Jan. 20, 2016, the disclosure of which is incorporated herein by reference.

FIELD OF THE INVENTION

The present invention relates to a method and a device for monitoring an autonomous driving operation of a motor vehicle within a parking facility. The present invention additionally relates to a motor vehicle, a parking facility, and a computer program.

BACKGROUND INFORMATION

The unexamined patent application DE 10 2012 222 562 A1 shows a system for managed parking facilities for an autonomous transfer of a vehicle from a start position into a target position. Data are ascertained for the autonomous transfer, based on which the vehicle is guided from the start position to the target position. It is important within the scope of the autonomous transfer that the vehicle does not collide with objects in its surroundings.

SUMMARY OF THE INVENTION

The object underlying the present invention is to provide an efficient concept for efficient monitoring of an autonomous driving operation of a motor vehicle within a parking facility. This object is achieved with the aid of the respective subject matter of the descriptions herein. Advantageous embodiments of the present invention are the subject matter of respective further descriptions herein.

According to one aspect, a method for monitoring an autonomous driving operation of a motor vehicle within a parking facility is provided, including the following steps:
  ascertaining data for an autonomous driving operation of the motor vehicle;
  checking the ascertained data for errors before the data are used for an autonomous driving operation of the motor vehicle;
  if the check revealed that the data have no errors, then the data are used for the autonomous driving operation of the motor vehicle;
  if the check revealed that the data have an error, then safety actions are carried out to reduce the risk of collision for the autonomously driving vehicle.

According to another aspect, a device is provided for monitoring an autonomous driving operation of a motor vehicle within a parking facility, including:
  an ascertaining device for ascertaining data for an autonomous driving operation of the motor vehicle;
  a checking device for checking the ascertained data for errors before the data are used for the autonomous driving operation of the motor vehicle;
  a control unit which is configured to autonomously drive the motor vehicle using the ascertained data if the check revealed that the data have no errors;
  the control unit being configured to control an execution of a safety action in order to reduce a risk of collision for the autonomously driving motor vehicle if the check revealed that the data have an error.

According to another aspect, a motor vehicle is provided which includes the device for monitoring an autonomous driving operation of a motor vehicle within a parking facility.

According to another aspect, a parking facility is provided which includes the device for monitoring an autonomous driving operation of a motor vehicle within a parking facility.

According to yet another aspect, a computer program is provided which includes program code to carry out the method for monitoring an autonomous driving operation of a motor vehicle within a parking facility if the computer program is executed on a computer.

This present invention thus includes in particular and among other things the idea of checking whether the data, based on which the motor vehicle is to be autonomously driven, have errors, the check being carried out even before the motor vehicle autonomously drives based on these data, i.e., before these data are used for the autonomous driving of the motor vehicle. Thus, errors in the data may be promptly detected in an advantageous way so that it may be efficiently prevented in an advantageous way that the motor vehicle autonomously drives based on erroneous data, i.e., that the ascertained data are used for the autonomous driving operation of the motor vehicle.

By carrying out the safety action if the check revealed that the data have an error, the technical advantage is yielded in particular that a risk of collision for the autonomously driving motor vehicle may be reduced.

Thus, in general, the technical advantage is yielded in an advantageous way that safety for the autonomously driving motor vehicle may be increased. The technical advantage is thus yielded in particular that safety may be likewise increased for objects located within the parking facility when the motor vehicle autonomously drives within the parking facility. Such objects are, for example, additional motor vehicles, persons, or bicycle riders.

In general, the technical advantage may thus be yielded in particular that the autonomous driving of the motor vehicle may be efficiently monitored.

The term "driverless" may also be used instead of the term "autonomous".

A parking facility within the sense of the present invention may also be referred to as a parking area and is used as a parking area for motor vehicles. The parking facility thus forms in particular a contiguous area that has multiple parking spaces (with respect to a parking facility on private property) or parking positions (with respect to a parking facility on public property). The parking facility is configured as a parking deck according to one specific embodiment. According to one specific embodiment, the parking facility is configured as a parking garage.

Autonomous driving of the motor vehicle includes remote control of the motor vehicle according to one specific embodiment. Thus, this means that the motor vehicle is remote controlled in the context of autonomous driving. The ascertained data may be used for remote control of the motor vehicle.

According to one specific embodiment, autonomous driving of a motor vehicle includes autonomous driving of the motor vehicle within the parking facility. This thus means that it is provided in particular in the context of autonomous driving of the motor vehicle that the motor vehicle drives autonomously. The motor vehicle thus may drive autonomously based on the ascertained data.

According to one specific embodiment, it is provided that autonomous driving of the motor vehicle includes that the motor vehicle is remote controlled along a partial section of a route leading from a start position to a target position within the parking facility and drives autonomously an additional partial section of the route leading from the start position to the target position. The ascertained data are thus used in particular both for the remote control as well as for the autonomous, i.e., self-driving of the motor vehicle.

According to one specific embodiment, it is provided that the motor vehicle is assisted during its autonomous driving. Such assistance includes, for example, that data, for example the ascertained data, are transmitted to the motor vehicle via a communication network, based on which the motor vehicle may drive autonomously. Such data include, for example, map data from a digital map and/or setpoint trajectory data of a setpoint trajectory to be autonomously traveled by the motor vehicle and/or target position data of a target position within the parking facility at which the motor vehicle should arrive autonomously.

According to one specific embodiment, the communication network includes a WLAN communication network and/or a mobile radio communication network and/or a communication network according to the LoRa standard. "LoRa" stands for "long range radio."

According to one specific embodiment, a communication is encrypted via the respective communication network.

According to one specific embodiment, it is provided that the safety action includes one or more elements selected from the following group of safety actions, or that the safety action is selected from the following group of safety actions:
  triggering of a safety function, for example an emergency stop;
  transmitting a message via a communication network that a problem has occurred; ignoring those ascertained data that have errors;
  triggering another and/or a repeated check whether the ascertained data have errors or not.

Triggering an emergency stop means, in particular, that the motor vehicle is decelerated to a stop. The message is, for example, transmitted to an operator of the parking facility. That those ascertained data are ignored means, in particular, that the motor vehicle continues driving autonomously based on the previously ascertained data, i.e., that the motor vehicle continues driving autonomously based on those data according to which it presently drives autonomously. That those ascertained data are ignored thus means, in particular, that those data are used again which are presently being used for the autonomous driving of the motor vehicle. Triggering another check and/or a repeated check (a repeated check is a check which is carried out exactly as the most recently carried out check), means, in particular, that data, which are to be used for the autonomous driving operation of the motor vehicle, are ascertained again.

According to one specific embodiment, multiple safety actions are carried out. Statements which are made in conjunction with one safety action similarly apply for multiple safety actions and vice versa.

According to one specific embodiment, it is provided that the ascertained data include the following: a control command for activating an actuator and/or controller of the motor vehicle and/or a new status of a partial implementation, in particular carrying out an automatic parking procedure of the motor vehicle.

Thus, the technical advantage is yielded in particular that it may be efficiently ensured that an actuator or a controller of the motor vehicle may be activated error free. In particular, the technical advantage may thus be yielded that the new status of the (partial) implementation of the automatic parking procedure of the motor vehicle is correctly determined.

An actuator or a controller of the motor vehicle is, for example, included by a drive system or by a steering system or by a braking system of the motor vehicle. According to one specific embodiment, multiple control commands are provided. Thus, it is provided, for example, that the multiple control commands activate one or multiple actuators, one or multiple controllers of a braking system, of a drive system, or of a steering system of the motor vehicle.

An automatic parking procedure of the motor vehicle refers in particular to a procedure, within which the motor vehicle automatically drives from a drop-off position of the parking facility to a parking space of the parking facility and is automatically parked at the parking space. A drop-off position of the parking facility refers to a position of the parking facility, at which the motor vehicle is to be parked or is parked by its driver to carry out the automatic parking procedure.

Within the context of the automatic parking procedure, it is provided, for example, that the motor vehicle automatically drives from its parking space to a pick-up position and automatically parks itself at the pick-up position. A pick-up position of the parking facility refers to a position of the parking facility, at which a user picks up the vehicle after the automatic parking procedure is to be carried out or is carried out.

According to one specific embodiment, the drop-off position is identical to the pick-up position. In another specific embodiment, the pick-up position and the drop-off position are different positions.

An automatic driving operation of the motor vehicle within the sense of the automatic parking procedure includes an autonomous or driverless driving operation of the motor vehicle, thus, in particular, a remote-controlled or autonomous driving operation.

An automatic parking procedure may also be referred to as an AVP procedure. "AVP" stands for "automatic valet parking" and may be referred to as an automatic parking procedure.

A partial implementation of an AVP procedure is thus, for example, the drive from the drop-off position to the parking space. A partial implementation is thus, for example, the drive from the parking space to the pick-up position. A partial implementation is thus, for example, pulling into or out of the parking space.

According to one specific embodiment, it is provided that the check includes a plausibility analysis of the ascertained data, the ascertained data having an error if the plausibility analysis revealed that the ascertained data are implausible.

Thus, the technical advantage is yielded in particular that errors may be efficiently detected. Implausible data generally have errors. Implausible means within the sense of the present invention that the data are not plausible. The expression "not plausible" may also be used instead of the expression "implausible."

According to one specific embodiment, it is provided that older data are used for the plausibility analysis, based on which older data the motor vehicle is already autonomously driven or presently drives autonomously.

Thus, the technical advantage is yielded in particular that the plausibility analysis may be efficiently carried out. Thus, it is provided for example that a presently carried out action is compared with an action to be carried out in the future, which is predefined by the ascertained data, the plausibility being checked within the scope of the comparison.

According to one specific embodiment, it is provided that the control command includes a steering command for a steering system of the motor vehicle, that the steering system is to adjust a predetermined steering angle, the older data including a present steering angle of the motor vehicle, the plausibility analysis including that the predetermined steering angle is compared to the present steering angle, it being determined depending on the comparison that the ascertained data are plausible or implausible.

Thus, the technical advantage is yielded in particular that implausible data may be efficiently detected. If, for example, the control command specifies that the motor vehicle is to turn abruptly to the right, where in contrast the motor vehicle presently drives to the left, then this is not plausible, i.e., implausible, so that the corresponding control command is detected or determined as erroneous.

According to one specific embodiment, it is provided that the control command includes a braking command for a braking system of the motor vehicle and/or a drive command for a drive system of the motor vehicle to change a present movement direction of the motor vehicle and/or a present motor vehicle speed, the older data including a present movement direction and/or a present motor vehicle speed, the plausibility analysis including that a changed movement direction of the motor vehicle and/or a changed motor vehicle speed is compared with the present movement direction of the motor vehicle or with the present motor vehicle speed, it being determined depending on the comparison that the ascertained data are plausible or implausible.

Thus, the technical advantage is yielded in particular that it may be efficiently detected whether the control command is implausible or not.

If, for example, the control command specifies that the motor vehicle is to drive backward in the future, where in contrast it presently drives forward, without a deceleration phase being provided, then this is an indication of an implausible control command. If, for example, the control command specifies that the motor vehicle is to accelerate, where in contrast the motor vehicle is presently decelerating, without providing a phase in which the motor vehicle ends the deceleration over a predetermined period, then this is likewise an indication of an implausible control command.

According to one specific embodiment, it is provided that the older data include a present status of the partial implementation, in particular the implementation of the automatic parking procedure, the plausibility analysis including that the new status is compared to the present status, it being determined depending on the comparison that the ascertained data are plausible or implausible.

Thus, the technical advantage is yielded in particular that it may be efficiently detected whether the ascertained data are plausible or implausible. If, for example, the present status of the (partial) implementation of the automatic parking procedure indicates that the motor vehicle is still located at the drop-off position, however, the new status specifies that the motor vehicle is located at the pick-up position, then this is a clear indication that the ascertained data are not plausible, i.e., implausible.

Within the scope of the previously referred to comparisons, it is provided according to one specific embodiment that one or multiple setpoint values are predefined, the ascertained data being determined as plausible or implausible by exceeding or falling below the corresponding setpoint values. If, for example, a difference between the predetermined steering angle and the present steering angle is greater than or greater than or equal to a predetermined setpoint value, then the ascertained data are determined to be implausible, otherwise, they are determined to be plausible. If, for example, a difference between a present movement direction and a changed movement direction is greater than or greater than or equal to a predetermined setpoint value, then the ascertained data are determined to be implausible, otherwise they are determined to be plausible. If, for example, a difference between the changed motor vehicle speed and the present motor vehicle speed is greater than or is greater than or equal to a predetermined setpoint value, then the ascertained data are determined to be implausible, otherwise, they are determined to be plausible.

According to one specific embodiment, it is provided that one or multiple input variables are used to ascertain the data, the same input variable(s) and/or one or multiple additional input variable(s) being used for checking the ascertained data.

Thus, the technical advantage is yielded in particular that the check may be efficiently carried out. This is in particular the case if additional input variables are used. According to one specific embodiment, it is provided that only multiple additional input variables are used, which thus means, that according to this specific embodiment, the input variables, which were already used to ascertain the data, are not used for the check. Thus, it may be excluded, for example, that erroneous input variables then also yield erroneous results.

According to one specific embodiment, it is provided that the input variable(s) include(s) one or multiple elements selected from the following group of input variables: sensor data from a surroundings sensor of the motor vehicle, sensor data from a surroundings sensor of the parking facility, additional data ascertained with the aid of a parking facility management system for an autonomous driving operation of the motor vehicle, and additional data ascertained with the aid of the motor vehicle for an autonomous driving operation of the motor vehicle.

Thus, the technical advantage is yielded in particular that the ascertainment of the data or the check of the ascertained data may be efficiently carried out while considering a surroundings of the motor vehicle. A surroundings sensor according to the present invention detects a surroundings of the motor vehicle to ascertain sensor data according to the detected surroundings. Thus, knowledge about the surroundings of the motor vehicle is available in an advantageous way. For example, the sensor data may be analyzed for potentially present objects in the surroundings of the motor vehicle. According to one specific embodiment, multiple surroundings sensors are provided. Statements made in conjunction with one surroundings sensor apply similarly for multiple surroundings sensors and vice versa.

A surroundings sensor according to the present invention is, for example, one of the following surroundings sensors: radar sensor, LIDAR sensor, laser sensor, ultrasonic sensor, magnetic sensor, video sensor, infrared sensor, or magnetic sensor.

It is provided, for example, that the sensor data from the surroundings sensor of the motor vehicle are transmitted to the parking facility management system via a communication network. The parking facility management system uses these sensor data, for example, to check the ascertained data. It is provided according to one specific embodiment, for example, that the sensor data from the surroundings sensor of the parking facility are transmitted by the parking facility management system to the motor vehicle via a communication network. The motor vehicle uses these sensor data, for example, to check the ascertained data.

This applies similarly for those data that are ascertained with the aid of the motor vehicle or the parking facility management system, these data being the data which are to be used for the autonomous driving operation of the motor vehicle. This means, that the parking facility management system, for example, ascertains data for the autonomous driving operation of the motor vehicle. These data, ascertained by the parking facility management system, are transmitted to the motor vehicle via a communication network according to one specific embodiment. The motor vehicle uses these ascertained data, according to a specific embodiment, to check ascertained data which the motor vehicle has ascertained itself for the autonomous driving operation of the motor vehicle. The same applies similarly for the reversed case. This means, that according to one specific embodiment, the motor vehicle transmits its ascertained data to the parking facility management system via a communication network. The parking facility management system uses these ascertained data to check its own ascertained data.

Ascertained data for the autonomous driving operation of the motor vehicle, which have been ascertained in the motor vehicle, thus with the aid of the motor vehicle, may be referred to, for example, as motor vehicle data.

Ascertained data for the autonomous driving operation of the motor vehicle, which have been ascertained in the parking facility management system, i.e., with the aid of the parking facility management system, may be referred to, for example, as parking facility management system data.

According to one specific embodiment, it is provided that the parking facility management system data are used to ascertain the motor vehicle data. This means, in particular, that the parking facility management system data are used, for example, as an input variable.

According to one specific embodiment, it is provided that the motor vehicle data are used to ascertain the parking facility management system data. This means, in particular, that the motor vehicle data are used, for example, as an input variable.

The data (motor vehicle data or parking facility management system data) are thus transmitted, in particular according to one specific embodiment, from the motor vehicle to the parking facility management system respectively, according to one specific embodiment, from the parking facility management system to the motor vehicle via a communication network.

According to one specific embodiment, a communication interface is provided for communicating via a communication network. The communication interface is configured, for example, to receive or to transmit data.

According to one specific embodiment, the device includes the communication interface for communicating via a communication network.

According to one specific embodiment, the motor vehicle includes the communication interface for communicating via a communication network.

According to one specific embodiment, the parking facility management system includes the communication interface for communicating via a communication network.

According to one specific embodiment, the parking facility management system includes the device for monitoring autonomous driving of a motor vehicle.

According to one specific embodiment, it is provided that an algorithm is used to ascertain the data, the same and/or an additional algorithm being used to check the ascertained data.

Thus, the technical advantage is yielded in particular that the check may be efficiently carried out. In particular, if an additional algorithm is used, errors may be efficiently detected. According to one specific embodiment, it is provided that an additional algorithm is exclusively used. This means that, according to this specific embodiment, the algorithm, which has already been used to ascertain the data, is not the algorithm used to check the ascertained data.

If the same algorithm is used, a redundancy relating to the ascertainment of the data is effectuated in an advantageous way. If an additional algorithm is used, a plausibility analysis, in particular, is carried out in an advantageous way.

The following example is to describe this in greater detail: the algorithm to ascertain the data outputs as a result a motor vehicle setpoint speed of 6.5 km/h. If the same algorithm is used for checking, then the same algorithm should likewise output 6.5 km/h as the motor vehicle setpoint speed in order to determine that the ascertained data (result) have no errors.

If an additional algorithm is used, then it is sufficient within the sense of the plausibility analysis if the result of the check lies in the range between 6.0 km/h and 7.0 km/h when using the additional algorithm.

It is provided in one specific embodiment that the check includes a redundant ascertainment of the data based on the same algorithm, it being determined depending on a result of the redundant ascertainment whether the ascertained data have an error. This means that the algorithm, which is used to ascertain the data to be checked, is also used to check the ascertained data to be checked to the extent that a repeated ascertainment of the data is carried out for the autonomous driving operation (redundancy or redundant calculation). The data are thus ascertained twice, each time using the same algorithm.

In addition to such a redundant calculation, it is provided according to one specific embodiment that a plausibility analysis, as already described previously and/or subsequently, is provided or will be provided within the scope of the check. The check thus includes, for example in another specific embodiment, either exclusively a redundant calculation or exclusively a plausibility analysis or both a redundant calculation and a plausibility analysis.

According to one specific embodiment, multiple algorithms are used. This, in particular, for the ascertainment or the check. Statements which are made in conjunction with one algorithm apply similarly for multiple algorithms and vice versa.

According to one specific embodiment, it is provided that the device for monitoring an autonomous driving operation of a motor vehicle within a parking facility is configured or configured to implement or carry out the method for monitoring an autonomous driving operation of a motor vehicle within a parking facility. A range of technical functions of the device similarly result from a corresponding range of technical functions of the method and vice versa.

This means, in particular, that the checking device is configured, for example, to carry out a plausibility analysis. The control device is configured, for example, to control the motor vehicle based on a control command for activating an actuator and/or controller of the motor vehicle and/or based on a status for carrying out an automatic parking procedure of the motor vehicle.

According to one specific embodiment, it is provided that the motor vehicle is configured or configured to implement or carry out the method of monitoring an autonomous driving operation of a motor vehicle within a parking facility.

According to one specific embodiment, it is provided, for example, that the parking facility is configured or configured to implement or carry out the method for monitoring an autonomous driving operation of a motor vehicle within a parking facility.

According to one specific embodiment, it is provided that the parking facility management system is configured or configured to implement or carry out the method of monitoring autonomous driving of a motor vehicle within a parking facility.

According to one specific embodiment, the parking facility includes the parking facility management system.

According to one specific embodiment, the motor vehicle includes one or multiple surroundings sensors.

In one specific embodiment, the parking facility includes one or multiple surroundings sensors.

A surroundings sensor within the sense of the present invention is, for example, one of the previously described surroundings sensors.

Data for the autonomous driving operation of the motor vehicle are data which are suited so that a motor vehicle may drive autonomously using these data. Such data include, for example, the following data: map data from a digital map of the parking facility, setpoint trajectory data of a setpoint trajectory to be traveled by the motor vehicle, motor vehicle setpoint speed data of a motor vehicle setpoint speed to be maintained by the motor vehicle, control command data of control commands, as they have been previously described, status data of a status, as it has been previously described.

The expression, "data, based on which the motor vehicle is to drive autonomously" stands, in particular, as a place holder for the expression "data for the autonomous driving operation of the motor vehicle" or "data which are to be used for autonomous driving of the motor vehicle."

In one specific embodiment, it is provided that the check includes a check external to the motor vehicle of the ascertained data, a result of the check external to the motor vehicle being transmitted to the motor vehicle via a communication network, the check further including a check internal to the motor vehicle of the ascertained data using the result of the check external to the motor vehicle.

In one specific embodiment, it is provided that the check includes a check internal to the motor vehicle of the ascertained data, a result of the check internal to the motor vehicle being transmitted to the motor vehicle via a communication network for a check external to the motor vehicle of the ascertained data, so that the check further includes a check external to the motor vehicle of the ascertained data using the result of the check internal to the motor vehicle.

The present invention will be subsequently described in greater detail by way of exemplary embodiments.

In the following the same reference numerals are used for the same features.

DETAILED DESCRIPTION

Figure 1:
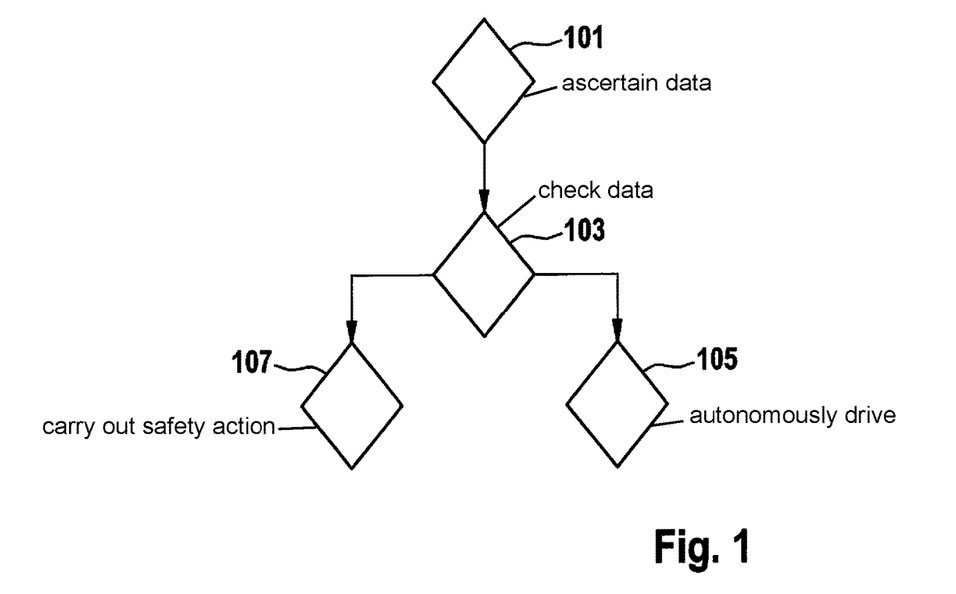
FIG. 1 shows a flow chart of a method for monitoring an autonomous driving operation of a motor vehicle within a parking facility.

FIG. 1 shows a flow chart of a method for monitoring an autonomous driving operation of a motor vehicle within a parking facility.

The method includes the following steps:
ascertaining 101 of data for an autonomous driving operation of the motor vehicle;
checking 103 the data for errors before the ascertained data are used for the autonomous driving operation of the motor vehicle;
if check 103 revealed that the data have no errors, then using 105 the data to autonomously drive the motor vehicle;
if check 103 revealed that the data have an error, then carrying out 107 a safety action to reduce a risk of collision for the autonomously driving motor vehicle.

Figure 2:
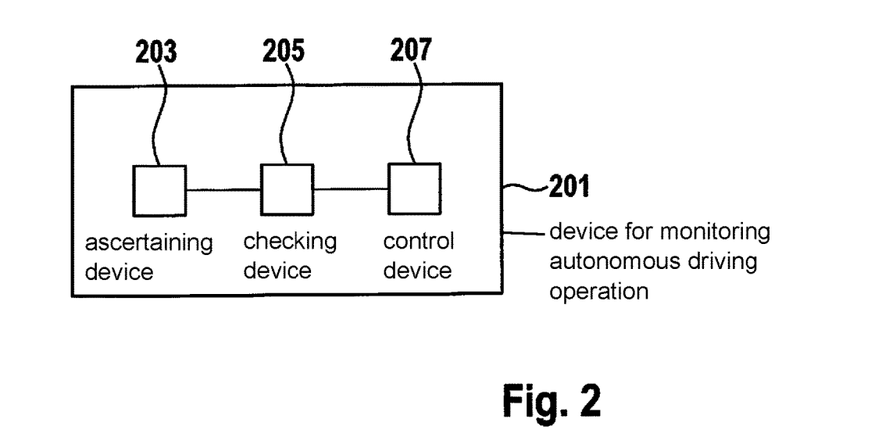
FIG. 2 shows a device for monitoring an autonomous driving of a motor vehicle within a parking facility.

FIG. 2 shows a device 201 for monitoring an autonomous driving operation of a motor vehicle within a parking facility.

Device 201 includes:
an ascertainment device 203 for ascertaining data for an autonomous driving operation of the motor vehicle;
a checking device 205 for checking the data for errors before the ascertained data are used for the autonomous driving operation of the motor vehicle;
a control device 207 which is configured to autonomously drive the motor vehicle using the ascertained data, if the check results that the data have no errors;
control device 207 being configured to control an implementation of a safety action to reduce a risk of collision for the autonomously driving motor vehicle, if the check revealed that the data have an error.

Figure 3:
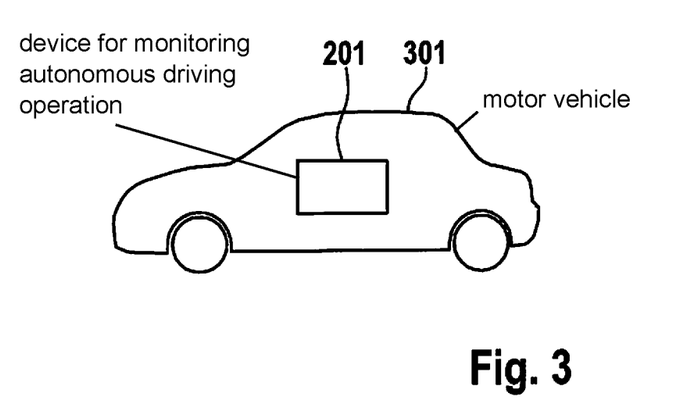
FIG. 3 shows a motor vehicle.

FIG. 3 shows a motor vehicle 301. Motor vehicle 301 includes device 201 from FIG. 2. For the sake of clarity, elements 203, 205, 207 are not shown.

Figure 4:
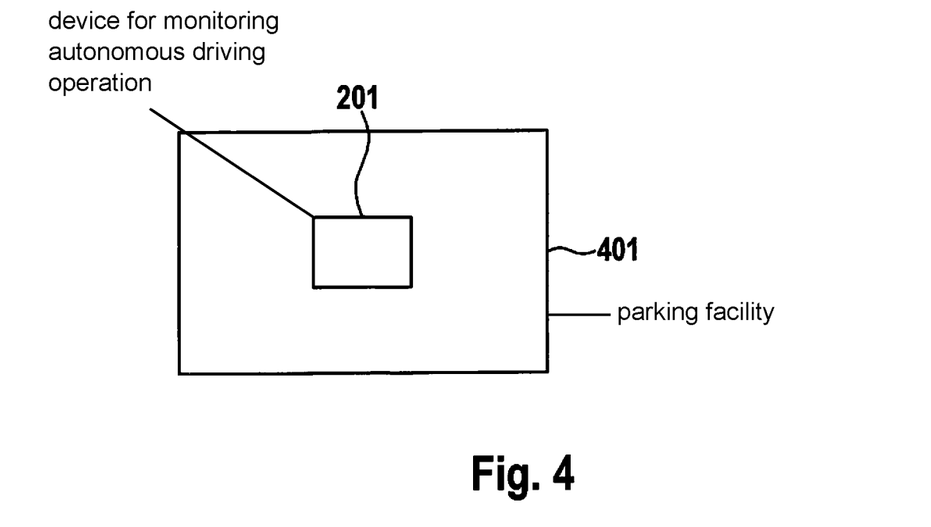
FIG. 4 shows a parking facility.

FIG. 4 shows a parking facility 401. Parking facility 401 includes device 201 from FIG. 2. For the sake of clarity, elements 203, 205, 207 are not shown.

Figure 5:
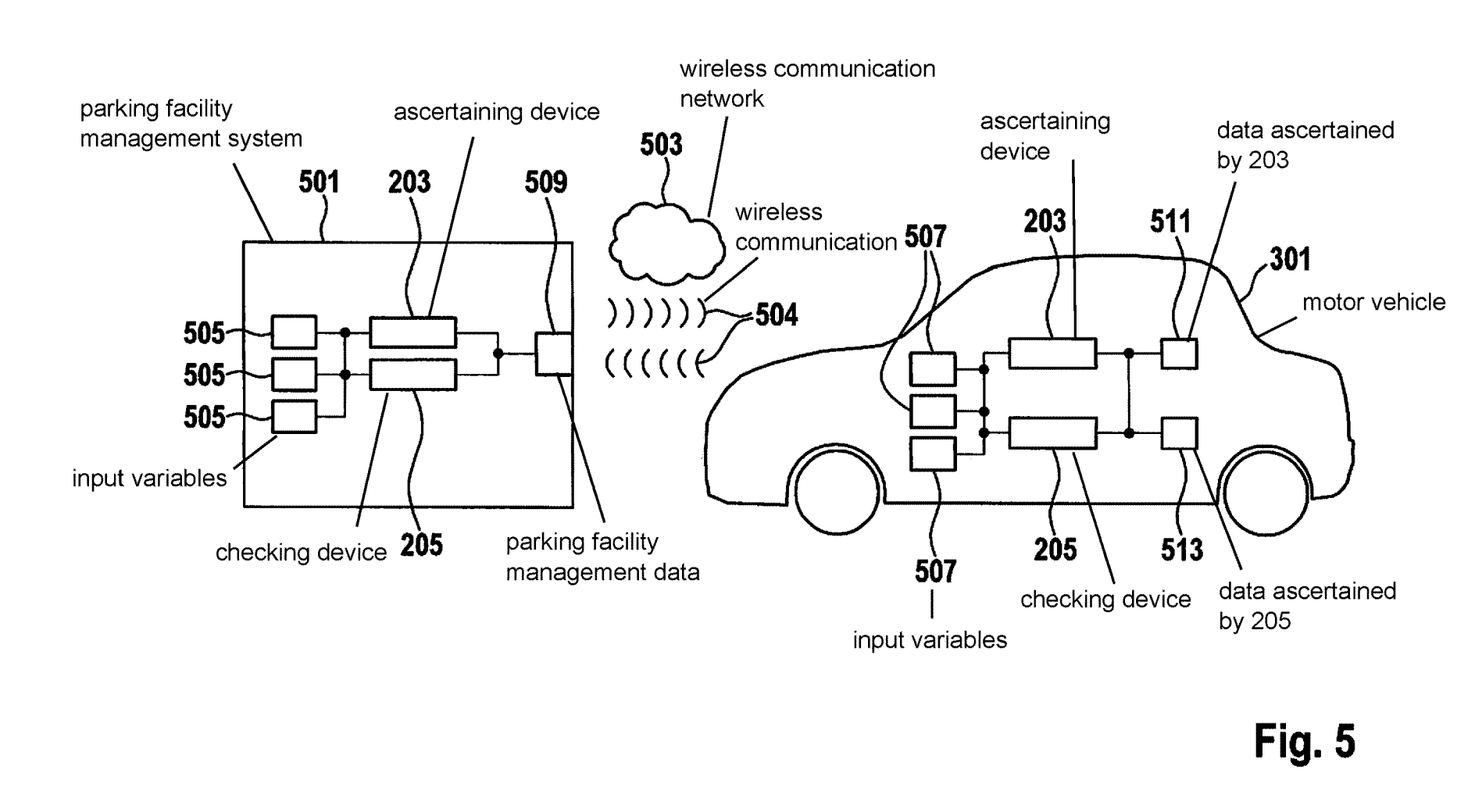
FIG. 5 shows a parking facility management system and the motor vehicle from FIG. 3.

FIG. 5 shows a parking facility management system 501. Parking facility management system 501 includes device 201 from FIG. 2, control device 207 not being shown for the sake of clarity.

Parking facility management system 501 includes a communication interface, likewise not shown here, with the aid of which parking facility management system 501 may respectively communicate with motor vehicle 301 from FIG. 3. This communication is carried out via a communication network 503, communication network 503 being a wireless communication network, which is represented symbolically with the aid of wave symbols using reference numeral 504. Wireless communication network 503 is, for example, a communication network as previously described.

Parking facility management system 501 ascertains data, based on which motor vehicle 301 is to drive autonomously, i.e., data for the autonomous driving of motor vehicle 301. Multiple input variables 505 are used for this purpose which are made available both to ascertainment device 203 and to checking device 205. Multiple input variables 505 are, for example, sensor data from surroundings sensors and/or data from databases. Such data from databases are, for example, position data about parking spaces of the parking facility. Input variables include, for example, traffic data of traffic within the parking facility.

Based on input variables 505, ascertainment device 203 ascertains data, based on which motor vehicle 301 is to drive autonomously, i.e., data which are to be used for the autonomous driving operation of motor vehicle 301.

Checking device 205 checks these data using the same input variables 505 which are made available to ascertainment device 203.

For example, it is provided that, based on input variables 505, checking device 205 likewise ascertains data, based on which the motor vehicle is to drive autonomously, i.e., data which are to be used for the autonomous driving operation of motor vehicle 301. These data, ascertained by checking device 205, are then compared with the ascertained data which ascertainment device 203 has ascertained. If these correspond, it is assumed that the data ascertained with the aid of ascertainment device 203 are error free, so that these may then be used for the autonomous driving operation of motor vehicle 301. These data, which are then used for the autonomous driving operation of motor vehicle 301, are symbolically represented in FIG. 5 with the aid of a block with reference numeral 509. Data 509 are thus parking facility management system data.

For example, it is provided that control device 207 of parking facility management system 501 includes a remote control device which is configured to remotely control motor vehicle 301 based on data 509. It is provided according to one specific embodiment that parking facility management system 501 transmits data 509 to motor vehicle 301 via communication network 503.

Motor vehicle 301 includes a communication interface, not shown, which is configured to communicate with parking facility management system 501 via communication network 503.

According to one specific embodiment, data 509 are used with the aid of device 201 of motor vehicle 301 to ascertain data itself, based on which motor vehicle 301 is to be driven autonomously. Parking facility management system data 509 are thus an input variable.

Motor vehicle 301 includes device 201 from FIG. 2, only ascertainment device 203 and checking device 205 being shown for the sake of clarity.

Similar to parking facility management system 501, input variables 507 are provided to ascertain the data, based on which motor vehicle 301 is to drive autonomously (thus data for the autonomous driving operation of motor vehicle 301). Multiple input variables 507 include data similar to multiple input variables 505, as they are described in conjunction with parking facility management system 501. In addition, it is provided according to one specific embodiment, that data 509 from parking facility management system 501 are likewise used by device 201.

Based on input variables 507 and/or on data 509, ascertainment device 203 ascertains data, based on which motor vehicle 301 is to drive autonomously, i.e., data for the autonomous driving operation of motor vehicle 301. It is provided in particular, that checking device 205 checks these ascertained data for errors before motor vehicle 301 drives autonomously based on the ascertained data.

For example, it is provided that, based on the same input variables 507 or data 509, checking device 205 itself ascertains data, based on which motor vehicle 301 is to drive autonomously. The data, which have been ascertained with the aid of checking device 205, and data, which have been ascertained with the aid of ascertainment device 203, are compared with one another, it being assumed upon agreement that the ascertained data of ascertainment device 203 are error free.

A schematically represented block with reference numeral 511 is to represent the ascertained data from ascertainment device 203. These data are thus motor vehicle data. Similarly, a block with reference numeral 513 is likewise shown, which is to schematically represent the data which have been ascertained with the aid of checking device 205. This means that, for example, in the case of agreement of data 511 and 513, it is assumed that data 511 have no errors. Thus, it is provided according to one specific embodiment, that data 511 are used for the autonomous driving operation of motor vehicle 301. It is provided, for example, that motor vehicle 301 drives autonomously within the parking facility based on data 511. Motor vehicle data 511 are, for example, transmitted to parking facility management system 501 via communication network 503 and are used by the system as an input variable for ascertaining the data.

If, however, ascertained data 509 or 511 should have an error, it is provided according to the present invention that one or multiple safety actions are carried out to reduce a risk of collision for the autonomously driving motor vehicle 301.

For example, it is provided that motor vehicle 301 automatically stops. It is provided according to a specific embodiment, for example, that a message that a problem has occurred is transmitted via a communication network. This message is transmitted, for example, to an operator of the parking facility. According to one specific embodiment, it is provided that ascertained data 509 or 511 are ignored, i.e., not considered. This means that, according to this specific embodiment, for example, a present driving instruction for the motor vehicle remains in force. This means that motor vehicle 301 continues to drive according to its present direction.

According to one specific embodiment, it is provided, for example, that a repeated check is carried out with the aid of checking device 205 as a safety action. According to one specific embodiment, it is provided, for example, that a repeated ascertainment of data with the aid of ascertainment device 203 is carried out as a safety action.

FIGS. 6 through 19 each show a possibility of a check of data as they may be used within the scope of the exemplary embodiments described here. Ascertainment device 203 and checking device 205 are shown in FIGS. 6 through 19; in specific embodiments that are not shown, ascertainment device 203 and checking device 205 are included in the motor vehicle and/or parking facility respectively, in particular in the parking facility management system.

Figure 6:
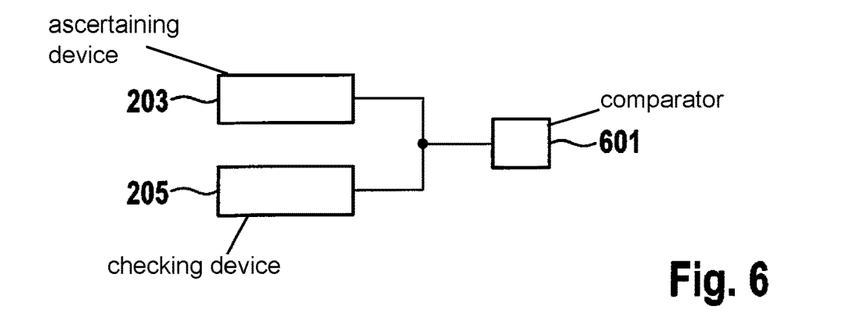
FIGS. 6 through 19 each show a different possibility of a check of ascertained data, based on which a motor vehicle is to drive autonomously.

It is thus provided according to FIG. 6 that each of the two devices 203, 205 ascertains data, based on input variables, based on which data the motor vehicle is to drive autonomously. These respectively ascertained data are supplied to a comparator 601 which is functionally assigned to checking device 205. Comparator 601 compares the respectively ascertained data for agreement, it being assumed upon agreement that the data, ascertained with the aid of ascertainment device 203, are error free.

Figure 7:
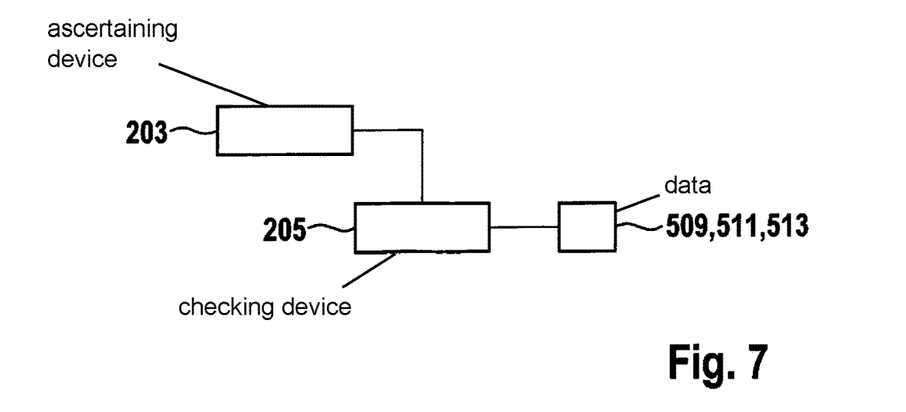

It is provided according to FIG. 7, that the ascertained data from ascertainment device 203 are provided to checking device 205 so that this may then directly check these data for errors. This is based in particular on the same and/or additional input variables. According to the result of this check, checking device 205 then outputs ascertained data 509, 511, 513, based on which the motor vehicle is to drive autonomously.

Figure 8:
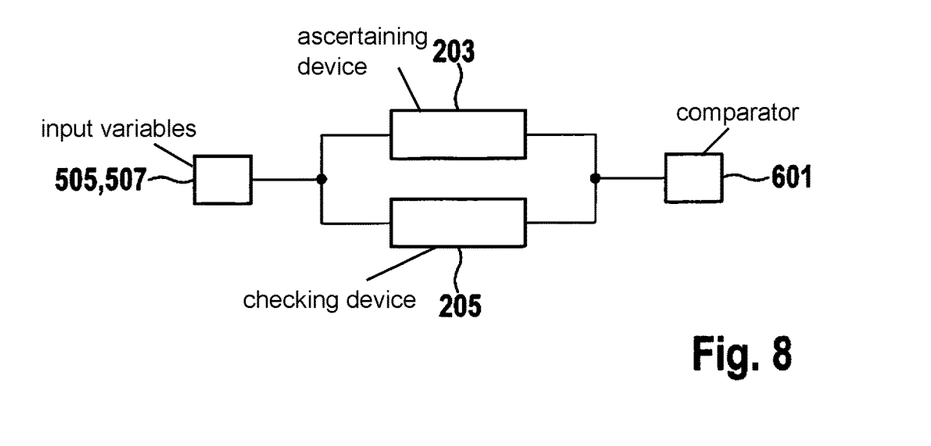
Figure 9:
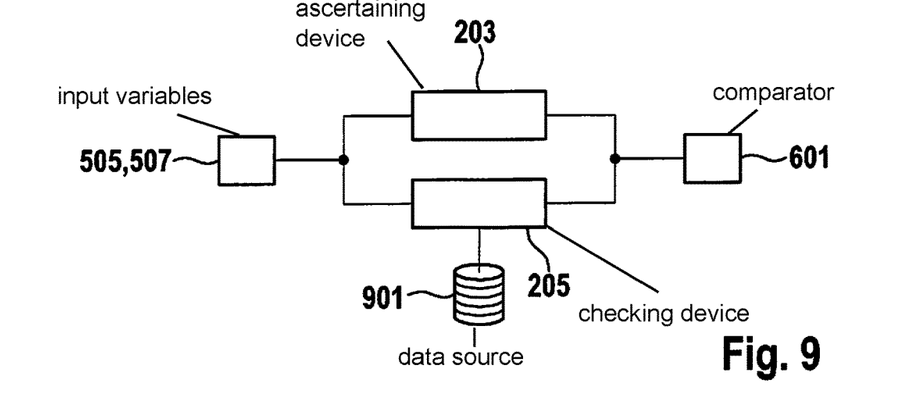
Figure 10:
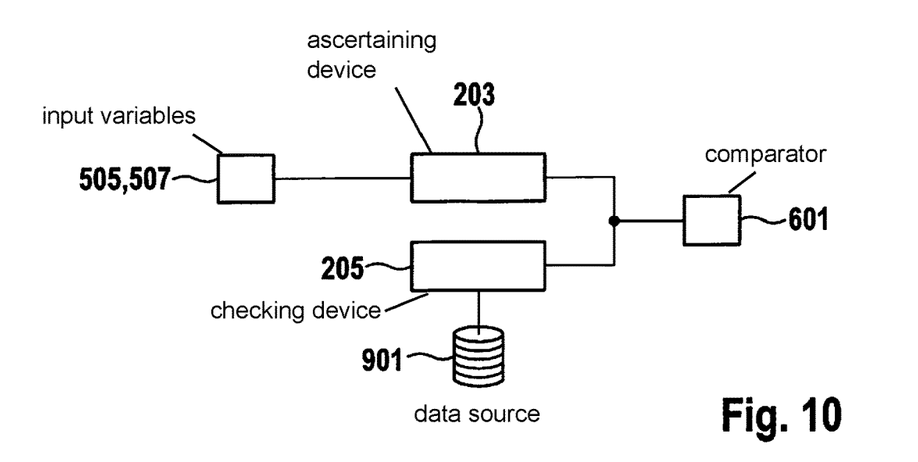

FIGS. 8 through 10 are based on the principle shown according to FIG. 6. According to FIG. 8, the same input variables are provided to both ascertainment device 203 and to checking device 205.

According to FIG. 9, in addition to input variables 505, 507, additional input variables 901 are provided to checking device 205 which may originate, for example, from an external data source. The external data source may be local, i.e., present in the parking facility management system or in the motor vehicle. Additional data 901 may, for example, be provided via a communication network.

FIG. 10 schematically shows, that according to this exemplary embodiment, checking device 205 only uses the data from additional data source 901 to check the data ascertained with the aid of ascertainment device 203.

Figure 11:
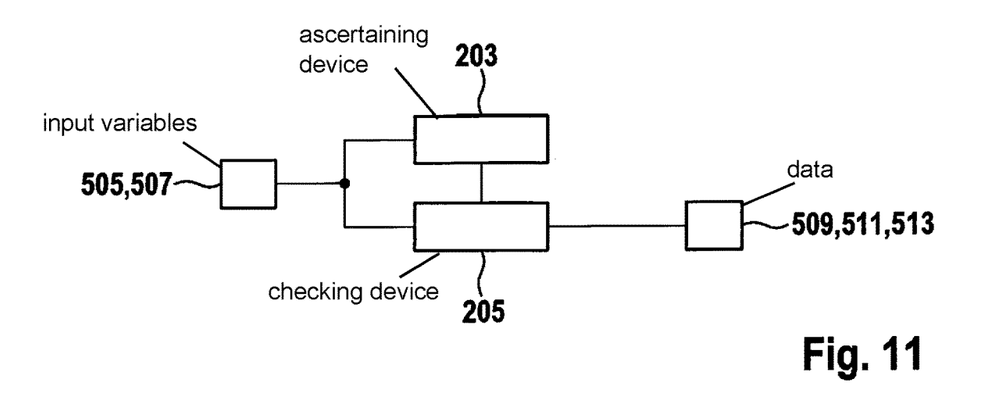
Figure 12:
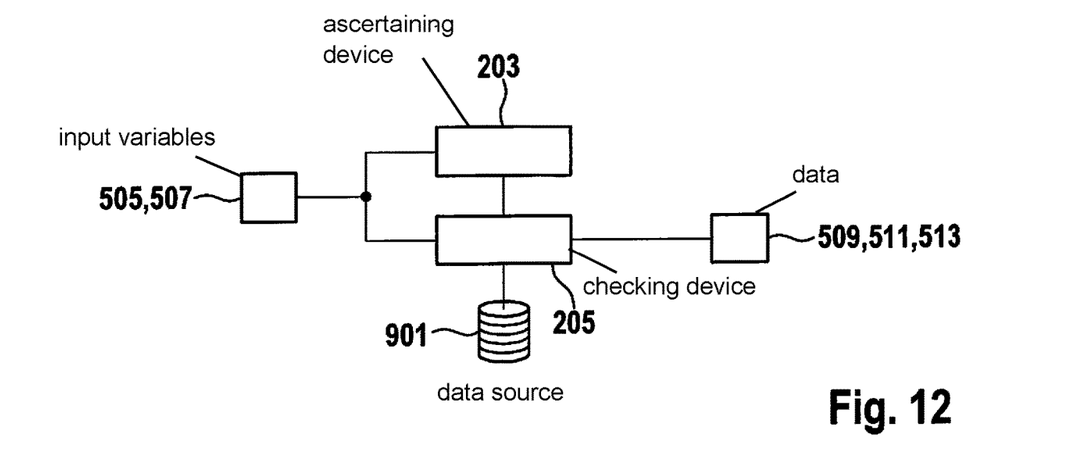
Figure 13:
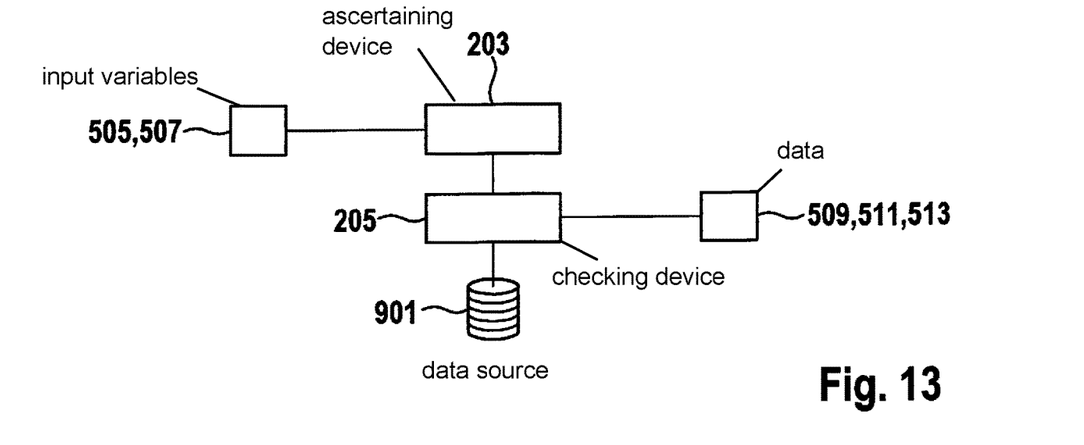
Figure 14:
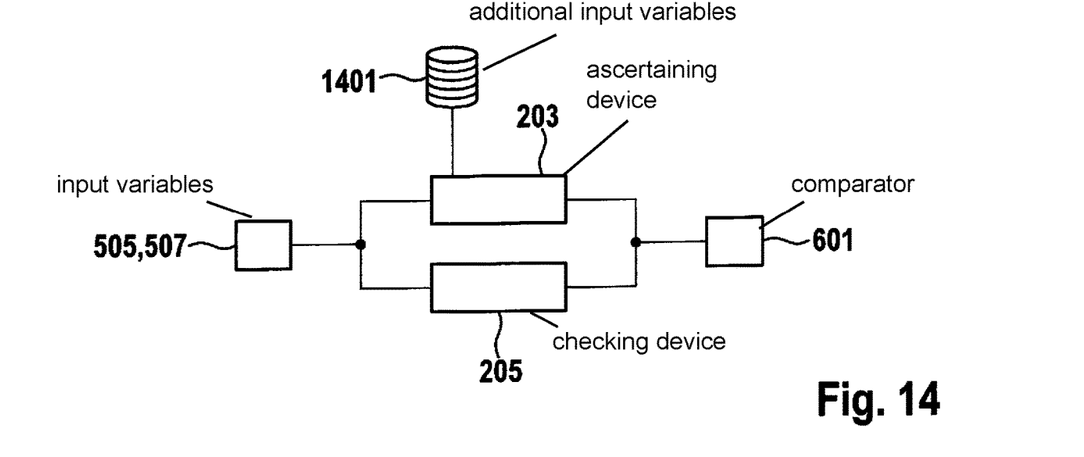
Figure 15:
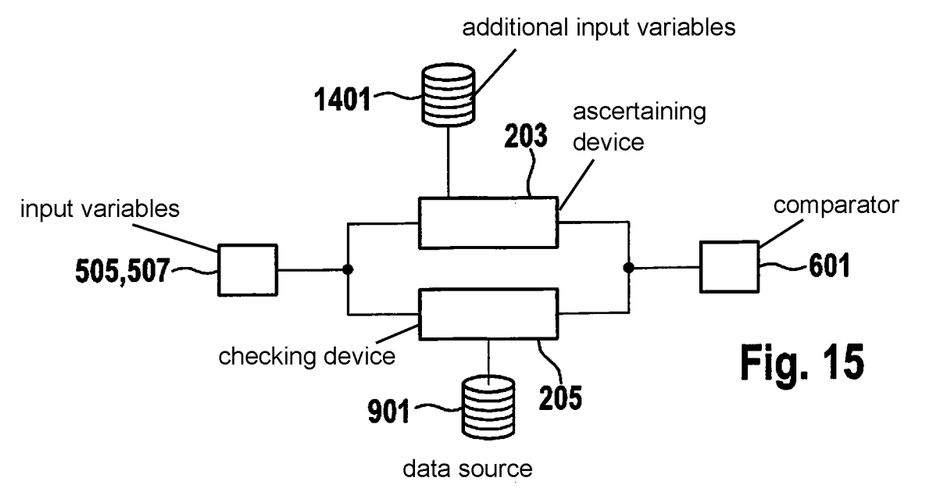
Figure 16:
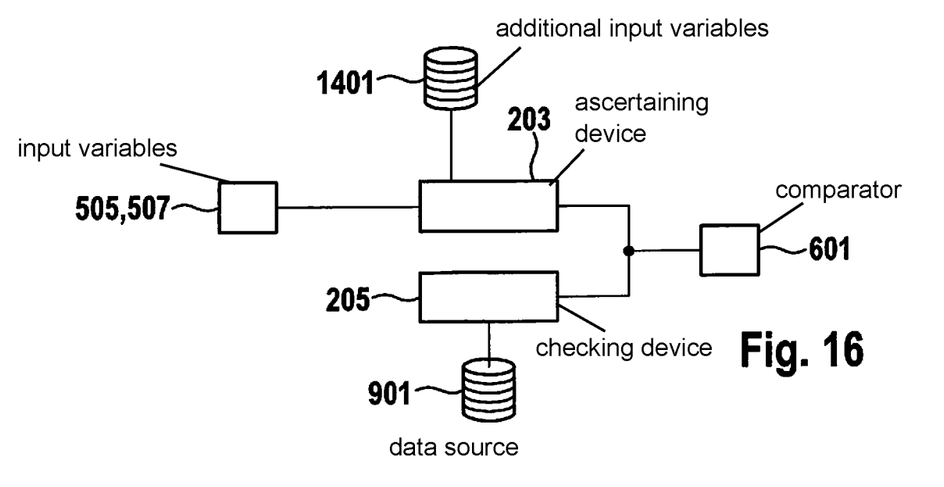
Figure 17:
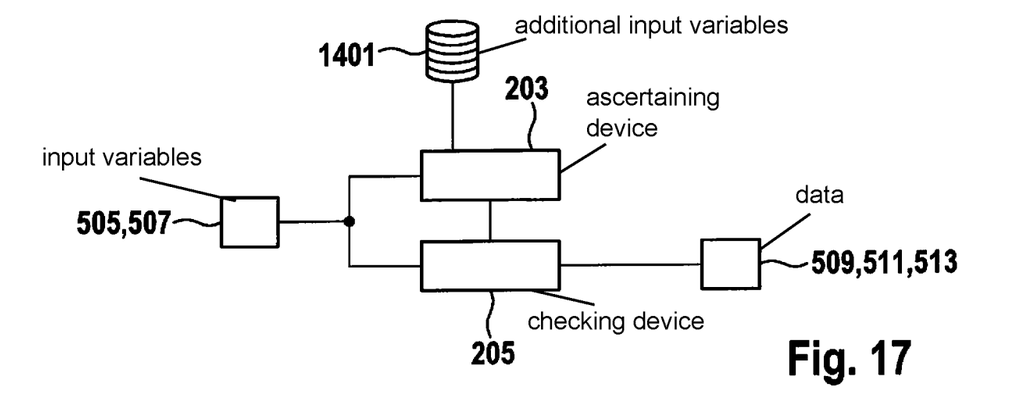
Figure 18:
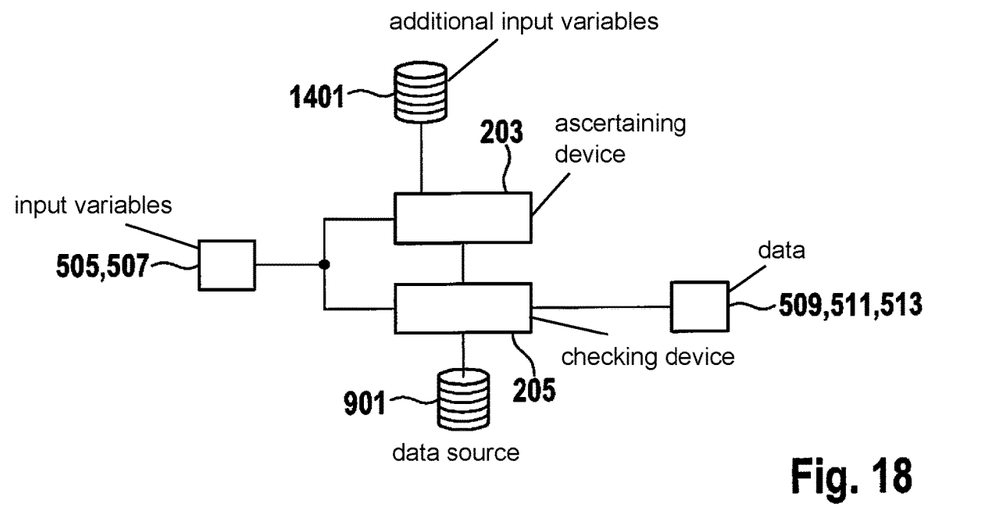
Figure 19:
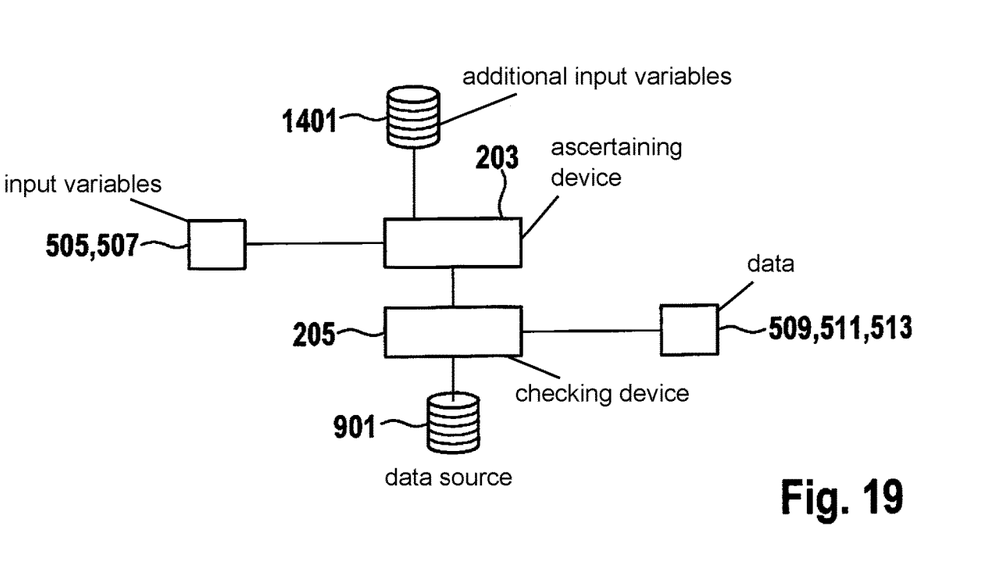

FIGS. 11 through 13 are based on the principle shown in FIG. 7, the same input variables 505, 507 being provided to both devices 203, 205 in FIG. 11 similar to FIG. 8. FIG. 12 is similar to the principle shown in FIG. 9, that checking device 205 has an additional data source 901 available. FIG. 13 is similar to the principle shown in FIG. 10, that checking device 205 exclusively has the data available from additional data source 901 to check the data ascertained with the aid of ascertainment device 203.

FIGS. 14 through 19 correspond essentially to the principle shown in FIGS. 8 through 13. A difference is provided in that additional input variables 1401 are provided to device 203, similar to some exemplary embodiments of device 205, based on which device 205 ascertains the data for the autonomous driving operation of the motor vehicle. The additional input variables may, for example, originate from an external data source. The external data source may also be present locally, i.e., in the parking facility management system or in the motor vehicle. The additional data or input variables 1401 may, for example, be provided via a communication network. Thus, exemplary embodiments are described in which device 203 has more input variables available than device 205.

The present invention thus includes in particular and among other things the idea of providing an efficient technical concept with the aid of which results and/or actions are monitored, checked, or subjected to plausibility analysis so that a basis for safety is provided. In particular, a risk of accident is thus reduced.

The basic idea according to the present invention is to be seen in particular in that results with respect to actions to be executed (data, based on which the motor vehicle is to drive autonomously), such as steering, braking, accelerating, as well as changes to partial processes/status within an AVP process (starting off from the drop-off position, pulling into the parking space, shutting off, pulling out of the parking space, starting off from the parking space, shutting off at the pick-up position) are monitored, safety actions being triggered in the event of illogical, incorrect, erroneous results or actions.

A safety action is thereby one or multiple of the following safety actions: triggering a safety function (for example an emergency stop), transmitting a message (for example to an operator), ignoring a result (that means that the last instruction remains in force), trigging another and/or a repeated analysis.

The idea according to the present invention is to be seen in particular in that an ascertainment device ascertains or calculates data, based on which the motor vehicle is to drive autonomously. These data include, for example, results or actions that are to be triggered. Sensor data or data from a database, for example, are used as a basis or foundation for ascertaining these data. For example, results from the parking facility management system may be transmitted to the motor vehicle, which then uses the result as an input variable for its own ascertainment of the data and vice versa.

According to the present invention, monitoring is provided for the step of ascertaining the data, based on which the motor vehicle is to drive autonomously. It is provided in particular that substeps are monitored for the ascertainment of the data, based on which the motor vehicle is to drive autonomously.

This means that, before actions are triggered, i.e. before the data are used for the autonomous driving operation of the motor vehicle, these are monitored so that in case of an error in these data, these data are no longer used so that a safety action is thus carried out instead.

Thus, it is prevented in an advantageous way that actuators, for example, for braking, steering, accelerating, are correspondingly activated according to the ascertained data. It may correspondingly be prevented that an erroneous status or process change is carried out according to the ascertained data.

In another specific embodiment, the monitoring or the check includes a redundant calculation, using the same and/or alternative algorithms, of data, based on which the motor vehicle is to drive autonomously.

This means that, for example, the ascertained data are checked with the aid of the same algorithm which has already been used to ascertain the data. The result of the check with the aid of the same algorithm is used with the result of the algorithm which was used to ascertain the data to be checked. This type of check may also be referred to as a redundancy check.

This means, for example, that the ascertained data are checked with the aid of another (i.e., an alternative or additional) algorithm. A result of the other algorithm is used for a plausibility analysis of the result of the algorithm which was used to ascertain the data to be checked. This type of check may also be referred to as a plausibility check.

According to one specific embodiment, a plausibility analysis (which may include, for example, a rough analysis or a logic analysis) may be provided in the monitoring step. Examples of such a plausibility analysis are, for example, the following:

- steering was always X degrees to the left in the last actions; in the new action, steering is suddenly in the opposite direction without transition;
- travel was X km/h forward in the last actions; in the new action, travel is suddenly in the opposite direction without transition;
- the last actions started from the drop-off position; the next sub-process of the AVP procedure is pulling out of the parking space.

This means that new results/actions (ascertained data) would be implausible, thus illogical, therefore these results/actions are not used or carried out.

According to a specific embodiment, the monitoring device monitors a connection between the ascertainment device and a device downstream from the ascertainment device which uses the data from the ascertainment device. Such a device is, for example, a control unit of the motor vehicle or a remote control device of the parking facility management system.

In one specific embodiment, the results/actions (ascertained data) are carried out or passed through by the monitoring device so that this device may decide whether the result or the action is allowed to pass through or what otherwise subsequently occurs.

According to one specific embodiment, the ascertainment device and the monitoring device receive the same input variables.

In another specific embodiment, the monitoring device receives additional input variables. This may be, for example, knowledge about a possible status change. These data may thereby originate locally as well as from external data sources (for example, via a cloud infrastructure).

According to another specific embodiment, the monitoring device exclusively receives the additional input variables.

In another specific embodiment, only output results/output actions respectively are monitored. This means, for example, that the data, which are transmitted to the motor vehicle, are monitored in the parking facility management system. This means, for example, that the data which trigger actions are monitored in the motor vehicle.

In another specific embodiment, input variables and output results/output actions are respectively monitored.

In another specific embodiment, monitoring is carried out exclusively in the motor vehicle.

What is claimed is:

1. A method for monitoring an autonomous driving operation of a motor vehicle within a parking facility, the method comprising:
    ascertaining data for an autonomous driving operation of the motor vehicle;
    checking the ascertained data for errors before the data are used for the autonomous driving operation of the motor vehicle;
    if the check reveals that the data have no errors, using the data to autonomously drive the motor vehicle; and
    if the check reveals that the data have an error, carrying out a safety action to reduce a risk of collision for the autonomously driving motor vehicle.

2. The method of claim 1, wherein the ascertained data include: a control command for activating an actuator or controller of the motor vehicle and/or a new status of a partial implementation.

3. The method of claim 1, wherein the check includes a plausibility analysis of the ascertained data, the ascertained data having an error if the plausibility analysis revealed that the ascertained data are implausible.

4. The method of claim 3, wherein older data, based on which the motor vehicle has already driven autonomously or presently drives autonomously, is used for the plausibility analysis.

5. The method of claim 4, wherein the ascertained data include a control command which includes a steering command for a steering system of the motor vehicle, that the steering system is to be adjusted to a predetermined steering angle, the older data including a present steering angle of the motor vehicle, the plausibility analysis including the comparison of the predetermined steering angle with the present steering angle, it being determined depending on the comparison that the ascertained data are plausible or implausible.

6. The method of claim 4, wherein the ascertained data include a control command which includes a braking command for a braking system of the motor vehicle and/or a drive command for a drive system of the motor vehicle to change a present movement direction of the motor vehicle and/or a present motor vehicle speed, the older data including a present movement direction and/or a present motor vehicle speed, the plausibility analysis including the comparison of a changed movement direction of the motor vehicle and/or a changed motor vehicle speed with the present movement direction of the motor vehicle or the present motor vehicle speed, it being determined depending on the comparison that the ascertained data are plausible or implausible.

7. The method of claim 4, wherein the older data include a present status of the partial implementation of the automatic parking procedure, the plausibility analysis including the comparison of the new status with the present status, it being determined depending on the comparison that the ascertained data are plausible or implausible.

8. The method of claim 1, wherein one or multiple input variables are used to ascertain the data, the same input variable(s) and/or one or multiple additional input variables being used to check the ascertained data.

9. The method of claim 8, wherein the input variable(s) include one or multiple elements selected from the following group of input variables: sensor data from a surroundings sensor of the motor vehicle, sensor data from a surroundings sensor of the parking facility, additional data ascertained with a parking facility management system for autonomous driving of the motor vehicle, and additional data ascertained with the motor vehicle for an autonomous driving operation of the motor vehicle.

10. The method of claim 1, wherein, to ascertain the data, data are used which were ascertained with a parking facility management system for the autonomous driving operation of the motor vehicle, or, to ascertain the data, data are used which were ascertained with the aid of the motor vehicle for the autonomous driving operation of the motor vehicle.

11. The method of claim 1, wherein an algorithm is used to ascertain the data, the same and/or an additional algorithm being used to check the ascertained data.

12. The method of claim 11, wherein the check includes a redundant ascertainment of the data based on the same algorithm, it being determined depending on a result of the redundant ascertainment whether the ascertained data have an error.

13. The method of claim 1, wherein the check includes a check external to the motor vehicle of the ascertained data, a result of the check external to the motor vehicle being transmitted to the motor vehicle via a communication network, the check additionally including a check internal to the motor vehicle of the ascertained data using the result of the check external to the motor vehicle.

14. The method of claim 1, wherein the check includes a check internal to the motor vehicle of the ascertained data, a result of the check internal to the motor vehicle being transmitted for a check external to the motor vehicle of the ascertained data via a communication network, so that the check additionally includes a check external to the motor vehicle of the ascertained data using the result of the check internal to the motor vehicle.

15. A device for monitoring an autonomous driving operation of a motor vehicle within a parking facility, comprising:
    an ascertainment device configured to ascertain data for an autonomous driving operation of the motor vehicle;
    a checking device configured to check the ascertained data for errors before the ascertained data are used for the autonomous driving operation of the motor vehicle; and
    a control device which is configured to autonomously drive the motor vehicle using the ascertained data if the check revealed that the data have no errors;
    wherein the control device is configured to control an implementation of a safety action to reduce a risk of collision for the autonomously driving motor vehicle if the check revealed that the data have an error.

16. A motor vehicle, comprising:
a device for monitoring an autonomous driving operation of a motor vehicle within a parking facility, including:
- an ascertainment device configured to ascertain data for an autonomous driving operation of the motor vehicle;
- a checking device configured to check the ascertained data for errors before the ascertained data are used for the autonomous driving operation of the motor vehicle; and
- a control device which is configured to autonomously drive the motor vehicle using the ascertained data if the check revealed that the data have no errors;
- wherein the control device is configured to control an implementation of a safety action to reduce a risk of collision for the autonomously driving motor vehicle if the check revealed that the data have an error.

17. A parking facility, comprising:
a device for monitoring an autonomous driving operation of a motor vehicle within a parking facility, including:
- an ascertainment device configured to ascertain data for an autonomous driving operation of the motor vehicle;
- a checking device configured to check the ascertained data for errors before the ascertained data are used for the autonomous driving operation of the motor vehicle; and
- a control device which is configured to autonomously drive the motor vehicle using the ascertained data if the check revealed that the data have no errors;
- wherein the control device is configured to control an implementation of a safety action to reduce a risk of collision for the autonomously driving motor vehicle if the check revealed that the data have an error.

18. A non-transitory computer readable medium having a computer program, which is executable by a processor, comprising:
a program code arrangement having program code for monitoring an autonomous driving operation of a motor vehicle within a parking facility, by performing the following:
- an ascertainment device configured to ascertain data for an autonomous driving operation of the motor vehicle;
- a checking device configured to check the ascertained data for errors before the ascertained data are used for the autonomous driving operation of the motor vehicle; and
- a control device which is configured to autonomously drive the motor vehicle using the ascertained data if the check revealed that the data have no errors;
- wherein the control device is configured to control an implementation of a safety action to reduce a risk of collision for the autonomously driving motor vehicle if the check revealed that the data have an error.

19. The method of claim 2, wherein the partial implementation includes an implementation of an automatic parking procedure of the motor vehicle.

* * * * *